United States Patent
Waters et al.

(10) Patent No.: US 7,024,180 B2
(45) Date of Patent: Apr. 4, 2006

(54) TARGETED INFORMATION DISPLAY

(75) Inventors: John Deryk Waters, Bath (GB);
Lawrence Wilcock, Malmesbury (GB);
James Thomas Edward McDonnell,
Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 625 days.

(21) Appl. No.: 09/859,817

(22) Filed: May 18, 2001

(65) Prior Publication Data
US 2002/0013144 A1 Jan. 31, 2002

(30) Foreign Application Priority Data
May 20, 2000 (GB) .................................... 0012132
May 20, 2000 (GB) .................................... 30003030

(51) Int. Cl.
*H04M 11/10* (2006.01)

(52) U.S. Cl. ................ 455/414.1; 455/412.1; 455/413; 455/418; 455/419; 455/517; 455/466; 455/556.1; 455/566

(58) Field of Classification Search ........... 455/412, 455/413, 414, 406, 426, 432, 456.1, 412.1, 455/418, 419, 517, 466, 556.1, 566, 414.1; 380/258, 270
See application file for complete search history.

(56) References Cited

U.S. PATENT DOCUMENTS

| | | | | |
|---|---|---|---|---|
| 4,791,408 A | * | 12/1988 | Heusinkveld | ................. 700/84 |
| 5,214,793 A | * | 5/1993 | Conway et al. | ............. 455/500 |
| 5,420,606 A | | 5/1995 | Begum et al. | .............. 345/156 |
| 5,740,549 A | | 4/1998 | Reilly et al. | .................. 705/14 |
| 5,848,129 A | * | 12/1998 | Baker | ......................... 379/67.1 |
| 6,091,956 A | * | 7/2000 | Hollenberg | .............. 455/456.5 |
| 6,115,611 A | | 9/2000 | Kimoto et al. | .............. 455/456 |
| 6,119,935 A | | 9/2000 | Jelen et al. | .................. 235/383 |
| 6,123,259 A | | 9/2000 | Ogasawara | ................. 235/380 |
| 6,283,377 B1 | | 9/2001 | Takuma | ...................... 235/492 |
| 6,535,132 B1 | * | 3/2003 | Waters et al. | ............. 340/573.1 |
| 6,549,625 B1 | * | 4/2003 | Rautila et al. | .............. 380/258 |
| 6,650,871 B1 | * | 11/2003 | Cannon et al. | ............ 455/41.2 |
| 6,731,940 B1 | * | 5/2004 | Nagendran | ............... 455/456.1 |

FOREIGN PATENT DOCUMENTS

| EP | 0848564 A2 | 6/1998 |
|---|---|---|
| EP | A-971303 | 12/2000 |
| JP | 10-13961 | 1/1998 |

OTHER PUBLICATIONS

Beadle, H.W.P., Harper, BB., Maquire Jr., G.Q. and Judge, J., "Location Aware Mobile Computing," *Proc. IEEE/IEE Internat'l Conference on Telecommunications (ICT'97)*, Melbourne (Apr. 1997).

* cited by examiner

*Primary Examiner*—Allan Hoosain

(57) ABSTRACT

The presence of persons is detected, for example, by detecting short-range communication devices carried by the detected persons. The interests of the detected persons are then determined by reference to specific interests transmitted by the user devices and/or by reference to customer profile data. The discovered interests of the current detected persons are then used to select content for display on an electronic display during a next display slot. The display is spaced from the zone in which the persons are detected, being located at a downstream location through which most of the detected persons will pass.

32 Claims, 3 Drawing Sheets

TARGETED INFORMATION DISPLAY

CROSS-REFERENCE TO RELATED APPLICATION

This application is related to U.S. patent application Ser. No. 09/859,816, filed May 18, 2001, now U.S. Pat. No. 6,535,132.

FIELD OF THE INVENTION

The present invention relates to a method and system for targeted information display and in particular, but not exclusively, to the targeted display of information to passers-by, for example, in a shopping mall.

BACKGROUND OF THE INVENTION

Mobile devices with communications capability are becoming ubiquitous, the most common being the cell phone and other devices employing cellular radio technology. Many services are being implemented using such devices and many more may be expected as information regarding the location or position of the mobile device becomes readily available through the implementation of location discovery within the mobile radio infrastructure.

One type of service that is emerging is the distribution of local information which is relevant only to a particular narrow geographic location and need only be communicated to people within that location. Such information is usually distributed as a result of a request generated from a mobile device, the request either including the device's location or authorizing the obtaining of the device's location from a location server of the mobile radio infrastructure. The locally-relevant information can also be pushed over the mobile radio infrastructure to mobile devices within a given locality, though the costs of doing so are high. The type of information which it is most desirable to be able to push is information with a certain immediacy to it either because the information will go out of date quickly or because the target audience is transitory. One example is where a theater still has seats available for a show shortly starting, and would like to offer the seats at half price. Another example is information about consumer goods (particularly new products or products under special promotion) which a shop wishes to advertise to consumers passing by.

In view of the cost and complexity of using cellular mobile radio networks to push information, it would be useful to have a different way of distributing local information which has immediacy to it.

A number of technologies exist for the short range communication of information between mobile devices. These technologies include infra-red based technologies and low-power radio technologies (including, in particular, the recent "Bluetooth" short range wireless standard). Depending on the technology implementation, differing types of message propagation will be enabled including asynchronous message broadcast, and multicast and point-to-point duplex connections established after coordination and negotiation between communicating devices.

Such short-range communication systems can be used to communicate information between commercial premises and passers-by provided, of course, the passers-by are equipped with suitable receiving devices. A further restriction on the usefulness of short-range communication devices for sending commercial information to passers-by is that passers-by will generally ignore such information unless they have some expectation that it will be of interest to them; even with this expectation, however, passers-by may well not be bothered to get out their communication device to check whether an incoming message is of interest.

It is known to display on an HTML display terminal a user's display page when the user approaches the terminal—see the paper "Location Aware Mobile Computing", H. W. Peter Beadle, B. Harper, G. Q. Maguire, J. Judge; Proc. IEEE/IEE International Conference on Telecommunications, (ICT'97), Melbourne, April, 1997. It is also known to push promotions concerning particular shops to the mobile devices of users who are detected as being near the shops and have a profile indicating that they are likely to be interested.

It is an object of the present invention to provide a method and system for presenting information to passers-by that overcomes at least some of the foregoing difficulties.

SUMMARY OF THE INVENTION

According to one aspect of the present invention, there is provided a method of targeted information presentation, comprising the steps of:

(a) detecting the presence of one or more persons in a presence zone on the basis of transmissions made from mobile communication devices carried by such persons;

(b) checking for interest indicators associated with the detected person or persons;

(c) selecting content for display having regard to interest indicators found in step (b); and (d) displaying the selected content on a display generally visible to persons in the presence zone or in a zone through which at least a substantial proportion of those persons will subsequently pass.

According to another aspect of the present invention, there is provided a display system comprising:

a detection arrangement for detecting the presence of one or more persons in a presence zone on the basis of transmissions made from mobile communication devices carried by such persons;

an interest-determination sub-system for obtaining interest indicators associated with the detected persons;

a content selector for selecting content for display having regard to the interest indicators obtained by the interest-determination sub-system; and an output arrangement comprising a display for displaying the content selected by the content selector, the display being located in a display zone which, at least at the time persons are detected in the presence zone, is remote from the presence zone but is positioned such it will be subsequently traversed by at least a substantial proportion of the persons detected in the presence zone.

BRIEF DESCRIPTION OF THE DRAWINGS

A method and system, both embodying the present invention, for the display of information to passers-by, will now be described, by way of non-limiting example, with reference to the accompanying diagrammatic drawings, in which:

FIG. 1 is a diagram illustrating the use by a shop of a short-range communications transceiver for communication with passers-by;

DETAILED DESCRIPTION OF THE PREFERRED EMBODIMENT

Figure 1:
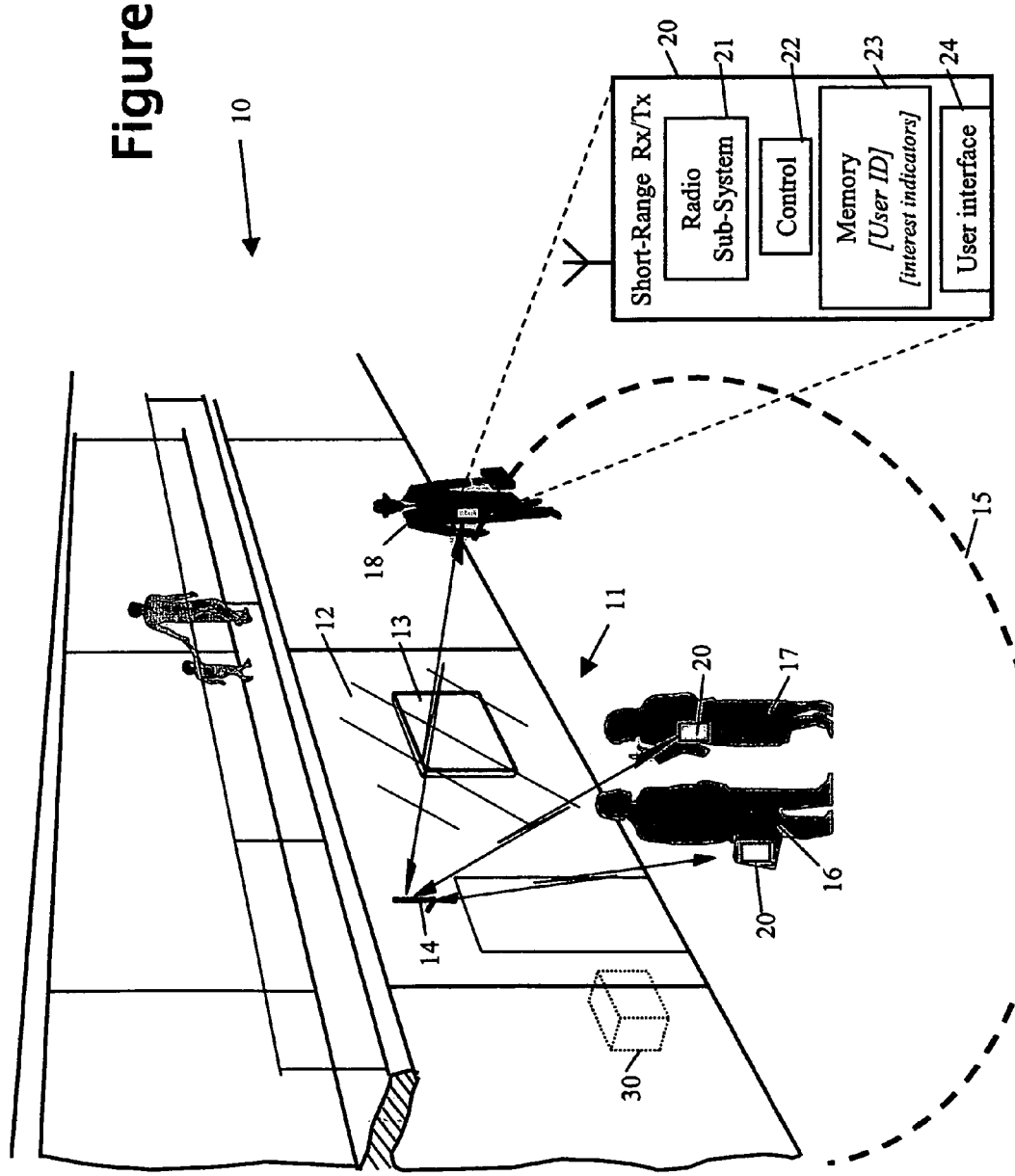

FIG. 1 depicts part of a shopping mall 10 and, in particular, a shop 11 with a display window 12 through which passers-by 16, 17, 18 can see an electronic display 13 (for example, a video monitor or LED display). The display 13 is used for displaying promotional and other information (generally referred to below as "content").

The shop 11 is equipped with a short-range wireless transceiver 14 for communicating with corresponding mobile devices 20 carried by passers-by when the latter are in a coverage zone 15 (also called below, the "presence zone"). The actual form of the short-range communications technology employed is not critical and any suitable technology can be used (for example, infra-red or Bluetooth radio system) together with any appropriate propagation regime (broadcast, multicast, repeated one-to-one, etc). In the present embodiment, a radio-based technology is depicted.

FIG. 1 shows certain details of one of the mobile devices 20. In particular, the device includes, in addition to the radio subsystem 21, a control block 22, a memory 23, and a user interface 24 through which the user can set in a user ID and interest indicators for storage in memory 23. The interest indicators may, for example, indicate that the user is interested in a general topic such as sports goods, or specific topics, such as buying a shirt of a particular color.

In general terms, the operation of the illustrated arrangement is as follows. The shop transceiver 14 emits a beacon signal at frequent intervals. The devices 20 of passers-by 16–18 in the presence zone 15 pick up this signal and each responds with a message containing the user ID and interest indicators stored in the device memory 23. The messages received at transceiver 14 are supplied to the shop's data processing system 30 which uses the user IDs to ascertain if any of the passers-by is a customer and, if so, looks up the customer's profile in a database to ascertain the customers interests. This interest information, together with that provided in the received messages, is then used to determine what content to display on the shop-window display 13 during a next display time slot—generally the objective would be to display content that is likely to be of the most interest to the current set of passers by taken as a whole (other objectives are also possible, as will be described below). An alert may also be sent back to those of the passers-by to whom the displayed content is particularly relevant.

Figure 2:
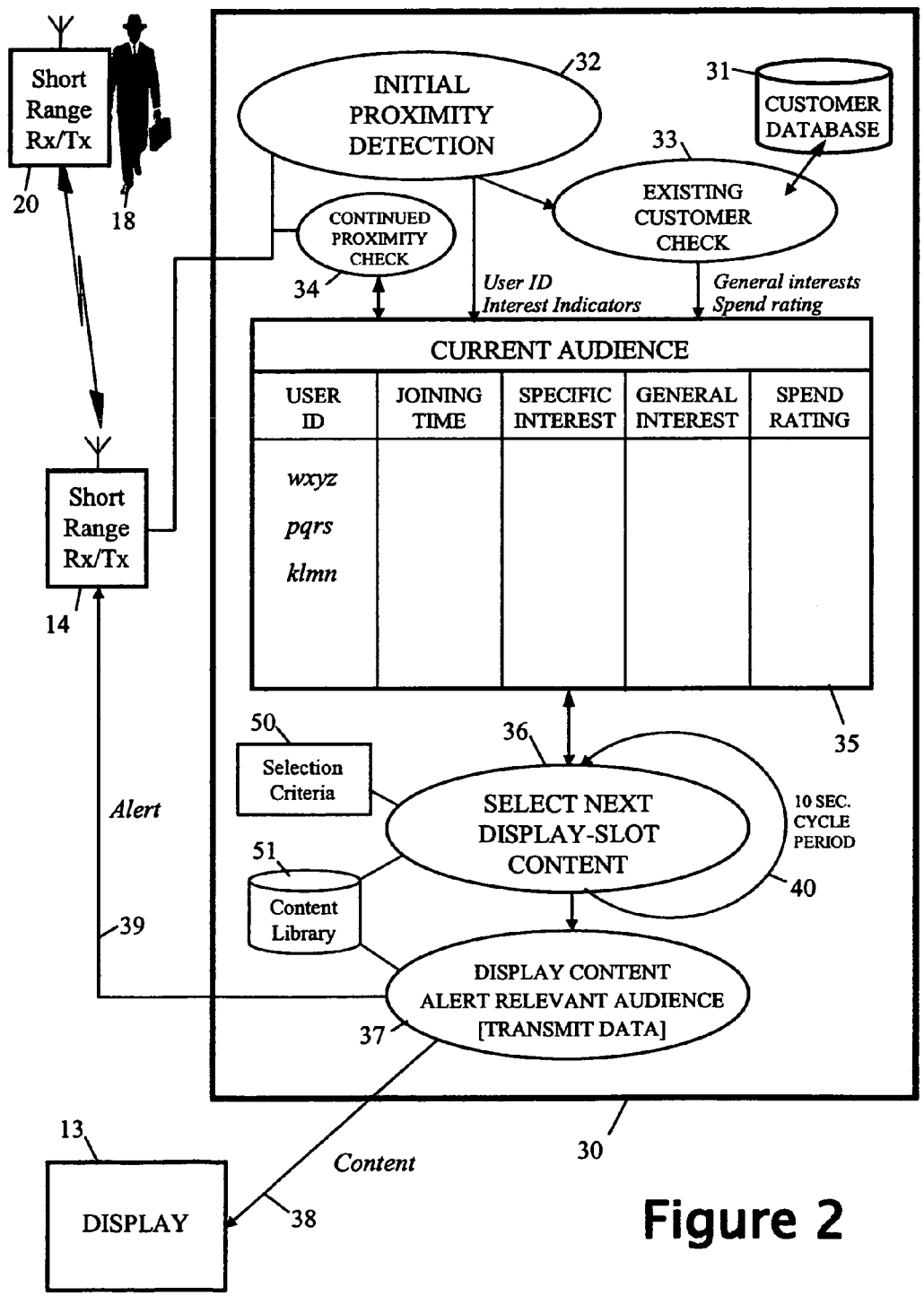
FIG. 2 is a diagram of a system used by the FIG. 1 shop to present passers-by with information of potential interest through a shop window display.

A more detailed description of the operation of the data-processing system 30 will now be given with respect to FIG. 2.

The data processing system 30 receives input from the short-range-transceiver 14 and provides output to the transceiver 14 and display 13. The system 30 includes a customer profile database 31. System 30 runs a number of processes of which:

processes 32, 33 and 34 are concerned with the maintenance of a current audience table 35 (stored in memory) that holds data on the interests of the current passers-by, and processes 36 and 37 are concerned with content selection and display having regard to the interest data held in table 35.

More particularly, process 32 is responsible for receiving the initial messages send back by devices 20 in response to the periodic beacon signal sent by transceiver 14. A device 20 is arranged to only sends its message in response to the first detection of the beacon signal from transceiver 14 so that process 32 can expect that the receipt of a message indicates a new passer-by in zone 15 (of course, the messaging protocol between a device 20 and transceiver 14 is preferably such that a reliable message delivery service is provided whereby the device will resend its message if safe receipt is not acknowledged by transceiver 14). In response to receipt of such a message, the process 32 first checks that a corresponding entry does not already exist in table 35 for the same user ID as contained in the message, and then causes a new table entry to be created in table 35 for the newly-detected passer-by. This entry includes the user ID, the time of entry creation ("joining time"), and any interest indicators contained in the corresponding message. Process 32 also passers the user ID of the message to a process 33 that uses it to check customer database 31 to ascertain whether the passer-by is an existing customer of shop 11; if so, process 33 extracts the customer's spend rating and any recorded interests and inserts them in the corresponding table entry. Spend rating is an indication of whether the customer is a high spender with the shop.

Since passers-by will only remain in presence zone 15 for a limited period, and since the audience table 35 is intended to keep track only of those passers-by currently capable of viewing the display 13, the table 15 needs to be kept up-to-date by the removal of entries that relate to passers-by that have moved on. This task is the responsibility of process 34 that continuously scans the "joining time" values in the table 35 and upon an entry having a value for this time that is, for example, 20 seconds earlier than the current time, process 34 causes transceiver 14 to send a presence-check message to the corresponding device. If a satisfactory acknowledgement message (distinguishable from the initial message) is received back, then process 34 simply updates the joining time for the entry concerned to correspond to the current time.

Process 36 is responsible for selecting the content for each successive display slot; each display slot is, for example, of ten seconds duration so that the process 36 operates on a 10 second cycle time. During each cycle, process 36 examines table 35 and on the basis of a predetermined set of selection criteria 50, selects the content to be displayed on display 13 in the next display slot. The content selection is made from amongst a content library 51 that comprises a set of specific promotions and an electronic store catalogue—the specific promotions are primarily intended to catch the attention of passers-by that indicate a general interest area matching a promotion whereas the electronic catalogue is intended to provide a source of content for matching more specific interests of passers-by.

The selection criteria can, for example, comprise the following criteria in order of precedence:

- the interests of the detected person with a highest spend rating as recorded in a customer profile database provided this rating is at least a threshold minimum rating;
- the most specific indicated interest relevant to a set of goods and/or services covered by content available for display;
- the best fit of indicated interests to a set of promotional offers covered by content available for display;
- the most common indicated interest of the detected persons.

Other criteria, and combinations of criteria, are of course possible.

Process 37 is responsible for controlling the presentation on display 13 of the content selected by process 36 for each successive display time slot (see arrow 38) Where the content being displayed is a good match with the indicated interests of a passer-by, then process 36 indicates this to process 37 and the latter is responsible for sending an alert message (see arrow 39) via transceiver 14 to the mobile device 20 carried by the passer-by concerned. Process 37 may also send the displayed content (or a resume of the content) to the passer-by along with the alert.

Many variants to the above-described arrangement are, of course, possible. Thus, for example, the proximity of passers-by could be detected using location discovery technology rather than relying on the ability to communicate with a short-range device; more particularly, where passers-by carry cellular mobile radio devices communicating with a cellular radio infrastructure equipped with location-determining means, the proximity of passers-by could be effected by using the location-determining means of the cellular radio infrastructure to detect when passers-by are in the presence zone (assuming that the latter have consented to the use of data about their location in this manner).

Since passers-by moving away from the display (though still in the presence zone) are less likely to have their attention caught by the display 13, these passers-by and their interests can usefully be ignored. To do this requires that the transceiver 14 either alone or in combination with a second transceiver, are capable of detecting when a user is moving towards and/or away from the display 13—one possible way of doing this is simply to require that each device sends a succession of short messages to the transceiver with the gap between each message send being constant and for the transceiver then to ascertain whether the interval between message receipts is increasing or decreasing (this, of course, assumes that the transceiver aerial location is close to the display so that movement towards/away from the aerial corresponds to movement towards/away from the display). Where a passer-by is detected as moving away, their entry in table 35 is removed.

With regard to the alert, where a passer-by is detected as moving in a particular direction past the shop, the alert can indicate whether the passer-by needs to look to the left or to the right to view the display. In this case, the alert could be an audio prompt or the activation of a vibrator on the appropriate one of the left-hand and right-hand sides of the user (for example, the passer-by could have vibrators in the heel of each shoe, these vibrators being linked by a Bluetooth link to the user's device 20 for appropriate activation). As regards how the direction of passing of the passer-by is detected, this could be done with two spaced transceivers 14 (or transceivers with shaped beams) whereby a passer-by coming from one direction will be detected first by one of the transceivers whilst a passer-by coming from the opposite direction will be detected first by the other transceiver.

Whilst in the illustrated arrangement the passers-by are moving past a shop, it will be appreciated that they could be moving past any type of premises or even just past a free-standing advertising display. Alternatively, the passers-by could be inside a building such as a large department store, the display being associated with a particular department in the store.

Figure 3:
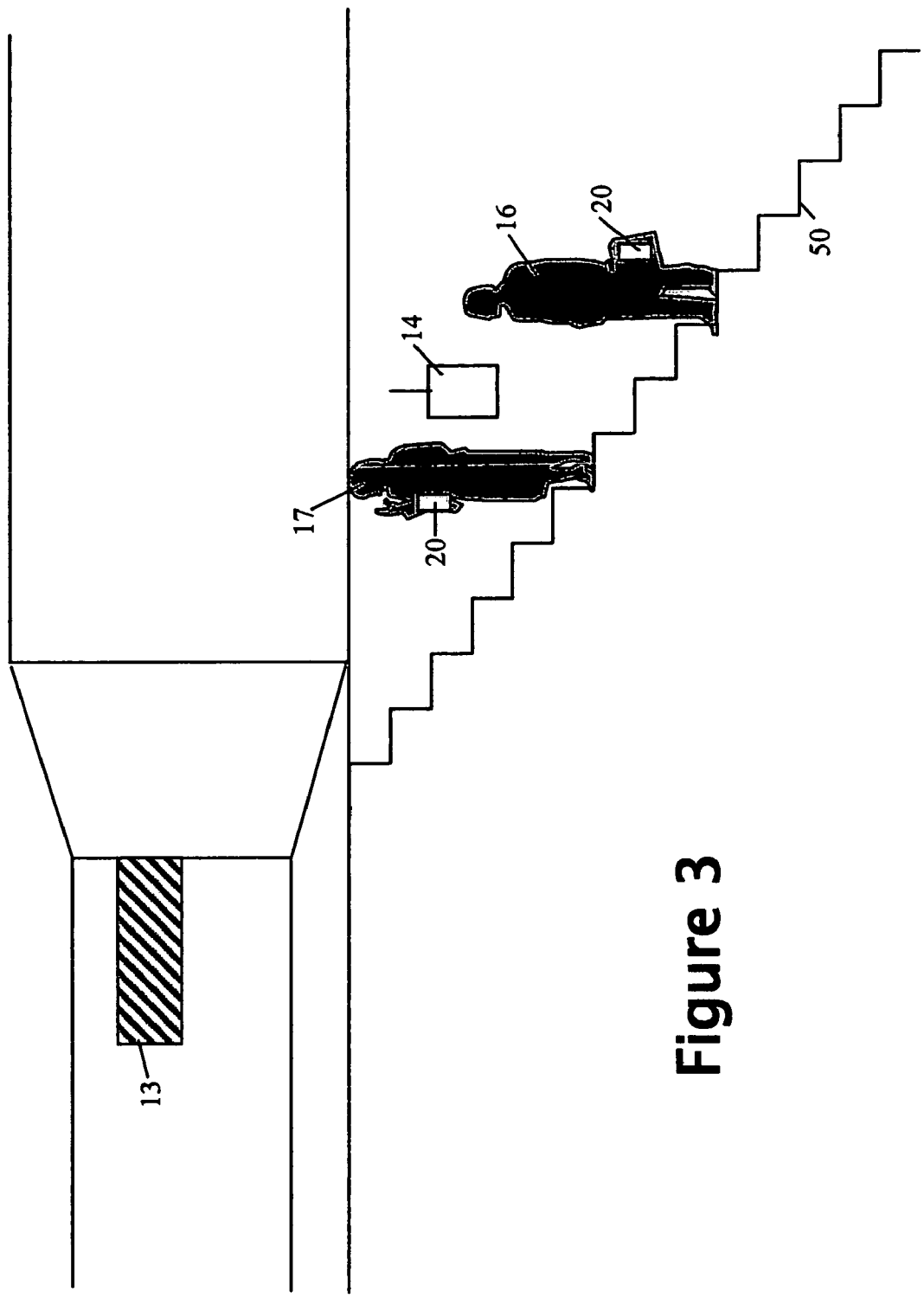
FIG. 3 is a diagram of an embodiment of the invention in which a display is provided at the top of an escalator.

In the above-described arrangements, the zone in which the display 13 is viewable is the same zone as the presence zone 15 in which the presence of passers-by is detected. However, this need not be the case and, according to the present invention, the zone in which the display 13 is viewable is made distinct from the presence zone 15, being spaced from the latter, at least at the time when the presence of persons is being detected. The display zone, could, for example, be downstream of the presence zone with respect to the flow of passers-by (provided that a substantial proportion of the passers-by detected in the presence zone are likely also to enter the display zone). For example, as is illustrated in FIG. 3, persons 16, 17 on an escalator 50 can be detected (by fixed transceiver 14 detecting short-range user devices 20) as they pass the halfway point, a display 13 at the top/bottom of the escalator being subsequently changed to show content of interest to at least some of the persons alighting from the escalator. A similar arrangement could be used with an elevator with the presence zone being the elevator itself. Again, the separation of presence zone and display zone can usefully be applied to an advertising display intended for motorists with the presence zone being upstream of the display zone in the sense of traffic flow.

As regards the timing of the presentation of selected content on the display where the display zone is spaced from the presence zone, this can be done simply by pre-setting a delay according to the particular circumstances (spacing of the zones, expected speed of advance of the persons concerned, etc.). Alternatively, a more dynamic timing control can be provided that triggers content display on the detection of an event indicating that the persons concerned have arrived near the display. The detected event could be the presence of one or more persons from the current group adjacent the display as detected, for example, by a short-range transceiver near the display that captures the identities of passers-by and feeds this information to the data processing system 30 where it is correlated with the identities of persons detected in the presence zone. Where a transportation vehicle (including, even, an elevator) is being used to carry people past the presence zone towards the display zone, then the arrival of the vehicle near the display can be detected and used to trigger display of the content selected for the people arriving in the vehicle.

The previously-described alerting process can also be applied where the display zone is separate from the presence zone. This can be implemented, for example, by a short-range transceiver located adjacent the display that is coupled back to the data processing system and used to output alert messages at the appropriate time as determined by the data processing system.

Further examples of separate presence and display zones include having a presence zone at a fixed location such as a busy street corner and the display zone on the side of a passing bus or other vehicle (in such cases, appropriate communication means would be needed between the fixed and moving parts of the system—typically all the elements of system 30 would be implemented in a fixed installation except for content library and the parts of the process 37 concerned with controlling the display, these parts being instructed over a wireless link as to what content should next be displayed). Alternatively, the presence zone could be at a bus stop and the display could be inside the bus—in this case, the displayed content would be adjusted to take account of the interests of the latest passengers.

The examples given in the foregoing paragraph relate to persons that belong to less dynamically changing groups than the passers-by transiting the presence zone 15 of FIG. 1. Where the composition of a group remains static for a substantial period, then the processes for detecting group members can be simplified and can, for example, simply note joiners to a particular group rather than having to add and remove persons on an on-going basis. Examples of application of the embodiments of the invention to such static groups include the following situations:

the display is located at a transportation terminal, the presence zone being located in a transport vehicle (including a train) or craft (including an aircraft) destined for the transportation terminal—in this case, the display would display relevant content for the arriving passengers, the display being informed by the transportation vehicle or craft as to what content was appropriate;

the display is located in a transport vehicle or craft, the presence zone being located at a transportation terminal from where the transport vehicle or craft is to leave—in this case, the terminal informs the transport vehicle or craft as to what content is appropriate;

the display is a cinema or stadium screen, the presence zone being inside the cinema or stadium (for example, in the entry areas).

What is claimed is:

1. A method of targeted information display, comprising the steps of:
   (a) detecting the presence of one or more persons in a presence zone based on transmissions made from mobile communication devices carried by such persons, said presence zone being at this time spaced from a display zone where a public display system is viewable;
   (b) checking for previously stored interest indicators associated with the detected person or persons;
   (c) selecting content having regard to interest indicators found in step (b); and
   (d) judging when relative movement between at least a substantial portion of the persons detected in step (a) and said public display system has brought the former into the display zone of the latter, and thereupon displaying the selected content on the public display system.

2. A method according to claim 1, wherein step (d) further includes sending an alert to at least one detected person who has an associated indicated interest relevant to the content being displayed, this alert being sent to the mobile communication device of the person.

3. A method according to claim 2, wherein said alert indicates whether the person being alerted should look to the left or right to view the display.

4. A method according to claim 1, wherein step (b) includes receiving interest indicators from said detected persons via said mobile communication devices, these interest indicators having been stored in said mobile communication devices prior to entry of the persons concerned into the presence zone.

5. A method according to claim 1, wherein step (b) includes receiving identity information directly or indirectly originating from said mobile communication devices and using this identity information to look up interest indicators in a database, these interest indicators having been stored in said database prior to entry of the persons concerned into the presence zone.

6. A method according to claim 1, wherein step (c) includes selecting content for display in dependence on any one or more of the following criteria:
   the most common indicated interest of the recently detected persons;
   the best fit of indicated interests to a set of promotional offers covered by content available for display;
   the most specific indicated interest relevant to a set of goods and/or services covered by content available for display;
   the interests of the detected person with a highest spend rating as recorded in a customer profile database.

7. A method according to claim 1, further including detecting whether the detected persons are moving towards the display, priority being given in step (c) to the indicated interests of such persons.

8. A method according to claim 1, wherein the display is located at a transportation terminal, the presence zone being located in a transport vehicle or craft destined for the transportation terminal.

9. A method according to claim 1, wherein the display is located in a transport vehicle or craft, the presence zone being located at a transportation terminal from where the transport vehicle or craft is to leave.

10. A method according to claim 1, wherein the display is located at a roadside and the presence zone is situated upstream, in the sense of traffic flow past the display.

11. A method according to claim 1, wherein the presence zone is at a fixed location and the display is located on or in a vehicle.

12. A method according to claim 1, wherein the presence zone is located intermediate the entry and exit points of an escalator, the display being provided at the level of the exit point.

13. A method according to claim 1, wherein in step (a) the mobile communication devices are short-range wireless devices, step (a) including picking up transmissions from devices in the presence zone using a short-range wireless receiver located in or near the presence zone.

14. A method according to claim 1, wherein in step (a) the mobile communication devices are cellular mobile radio devices communicating with a cellular radio infrastructure equipped with a location-determining sub-system, step (a) including using the location-determining sub-system of the cellular radio infrastructure to detect persons in the presence zone.

15. A method according to claim 1, wherein in step (d) judging when relative movement between at least a substantial portion of the persons detected in step (a) and said public display system has brought the former into the display zone of the latter is effected by timing out a predetermined time delay.

16. A method according to claim 1, wherein in step (d) judging when relative movement between at least a substantial portion of the persons detected in step (a) and said public display system has brought the former into the display zone of the latter is effected by detecting when said at least a substantial portion of the persons and the public display system move into proximity with each other.

17. A display system comprising:
   a detection arrangement for detecting the presence of one or more persons in a presence zone on the basis of transmissions made from mobile communication devices carried by such persons;
   an interest-determination sub-system for obtaining interest indicators associated with the detected persons;
   a content selector for selecting content for display having regard to the interest indicators obtained by the interest-determination sub-system;
   an output arrangement comprising a public display for displaying the content selected by the content selector, the display being viewable from within an associated display zone which, at least at the time persons are detected in the presence zone, is spaced from the presence zone; and
   a control arrangement arranged to judge when at least a substantial portion of the persons detected by the detection arrangement become present in the display zone of the public display system, and thereupon to cause the selected content to be displayed on the public display.

18. A display system according to claim 17, wherein the output arrangement further comprises an alert generator for sending an alert to a mobile communication device of at least one detected person who has an associated indicated interest relevant to the content being displayed by the display.

19. A display system according to claim 18, wherein said alert indicates whether the person being alerted should look to the left or right to view the display.

20. A display system according to claim 17, wherein the interest-determination sub-system is arranged to receive interest indicators from said detected persons via said mobile communication devices.

21. A display system according to claim 17, wherein the interest-determination sub-system is arranged to receive identity information directly or indirectly originating from said mobile communication devices and to use this identity information to look up interest indicators in a database.

22. A display system according to claim 17, wherein the content selector is arranged to select content for display in dependence on any one or more of the following criteria:
   the most common indicated interest of the recently detected persons;
   the best fit of indicated interests to a set of promotional offers covered by content available for display;
   the most specific indicated interest relevant to a set of goods and/or services covered by content available for display;
   the interests of the detected person with a highest spend rating as recorded in a customer profile database.

23. A display system according to claim 17, further comprising an arrangement for determining whether the detected persons are moving towards the display, priority being given by the content selector, when selecting content for display, to the indicated interests of such persons.

24. A display system according to claim 17, wherein the display is located at a transportation terminal, the presence zone being located in a transport vehicle or craft.

25. A display system according to claim 17, wherein the display is located in a transport vehicle or craft, the presence zone being located at a transportation terminal.

26. A display system according to claim 17, wherein the display is located at a roadside and the presence zone is situated upstream, in the sense of traffic flow, past the display.

27. A display system according to claim 17, wherein the presence zone is at a fixed location and the display is located on or in a vehicle.

28. A display system according to claim 17, wherein the presence zone is located intermediate the entry and exit points of an escalator, the display being provided at the level of the exit point.

29. A display system according to claim 17, wherein the detection arrangement is arranged to receive transmissions from short-range wireless devices that constitute said mobile communication devices.

30. A display system according to claim 17, wherein the detection arrangement is arranged to receive information about persons in the presence zone from a location-determination sub-system of a cellular radio infrastructure, said mobile communication devices being cellular mobile radio devices.

31. A display system according to claim 17, wherein the control arrangement is arranged to judge when at least a substantial portion of the persons detected by the detection arrangement become present in the display zone of the public display, by timing out a predetermined time delay from detection of said persons.

32. A display system according to claim 17, wherein the control arrangement is arranged to judge when at least a substantial portion of the persons detected by the detection arrangement become present in the display zone of the public display, by detecting when said at least a substantial portion of the persons are in proximity to the public display system.

* * * * *